United States Patent [19]

Pleasants

[11] 4,442,826
[45] Apr. 17, 1984

[54] PREFABRICATED PANEL FOR BUILDING CONSTRUCTION AND METHOD OF MANUFACTURING

[76] Inventor: Frank M. Pleasants, Star Rte., Dawsonville, Ga. 30534

[21] Appl. No.: 203,910

[22] Filed: Nov. 4, 1980

[51] Int. Cl.³ .................. F24H 7/00; E04H 14/00; F24D 5/10
[52] U.S. Cl. .................. 126/400; 126/437; 52/173 R; 52/577; 165/53
[58] Field of Search .......... 126/400, 430, 431, 437; 165/53, 56; 52/576, 577, 405, 173 R

[56] References Cited

U.S. PATENT DOCUMENTS

| Re. 29,517 | 1/1978 | Becker | 52/576 |
|---|---|---|---|
| 1,950,397 | 3/1934 | Cahill | 52/576 |
| 3,989,032 | 11/1976 | Harrison | 126/437 |
| 4,207,865 | 6/1980 | Allen | 126/431 |
| 4,241,782 | 12/1980 | Schoenfelder | 126/400 |
| 4,267,822 | 5/1981 | Diamond | 126/431 |

FOREIGN PATENT DOCUMENTS

| 2245619 | 12/1973 | Fed. Rep. of Germany | 126/400 |
|---|---|---|---|
| 2524264 | 12/1976 | Fed. Rep. of Germany | 126/437 |
| 2649273 | 3/1978 | Fed. Rep. of Germany | 126/431 |
| 2044434 | 10/1980 | United Kingdom | 126/431 |

OTHER PUBLICATIONS

Mechanics Illustrated, Dec. 1978, pp. 31 and 118.
Heating/Piping/Air Conditioning, Jan. 1980, J. Yellott, pp. 57–66.

*Primary Examiner*—Samuel Scott
*Assistant Examiner*—G. Anderson
*Attorney, Agent, or Firm*—Newton, Hopkins & Ormsby

[57] ABSTRACT

A precast construction panel for buildings and a method of manufacturing the panel are disclosed. The panel is lightweight and possesses full structural integrity with the ability to serve as a solar energy collector and/or storage module alone or in a system with other panels and active solar collection devices. The panel includes an internal, concealed containment element for the storage and circulation of a thermally efficient fluid, such as water. In the casting of the solar construction panel, the fluid-filled containment element serves as a core around which cementious material, such as concrete, is placed. The panel is provided with internal reinforcement as required.

3 Claims, 17 Drawing Figures

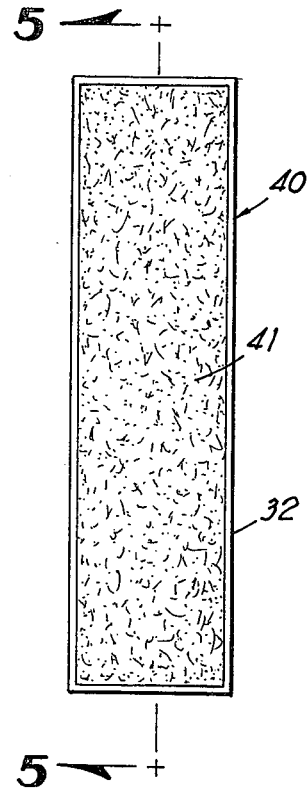
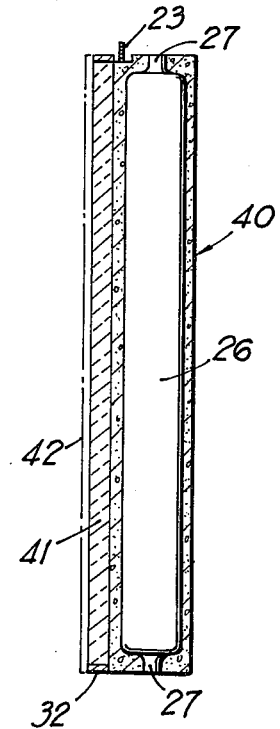
FIG 4  FIG 5
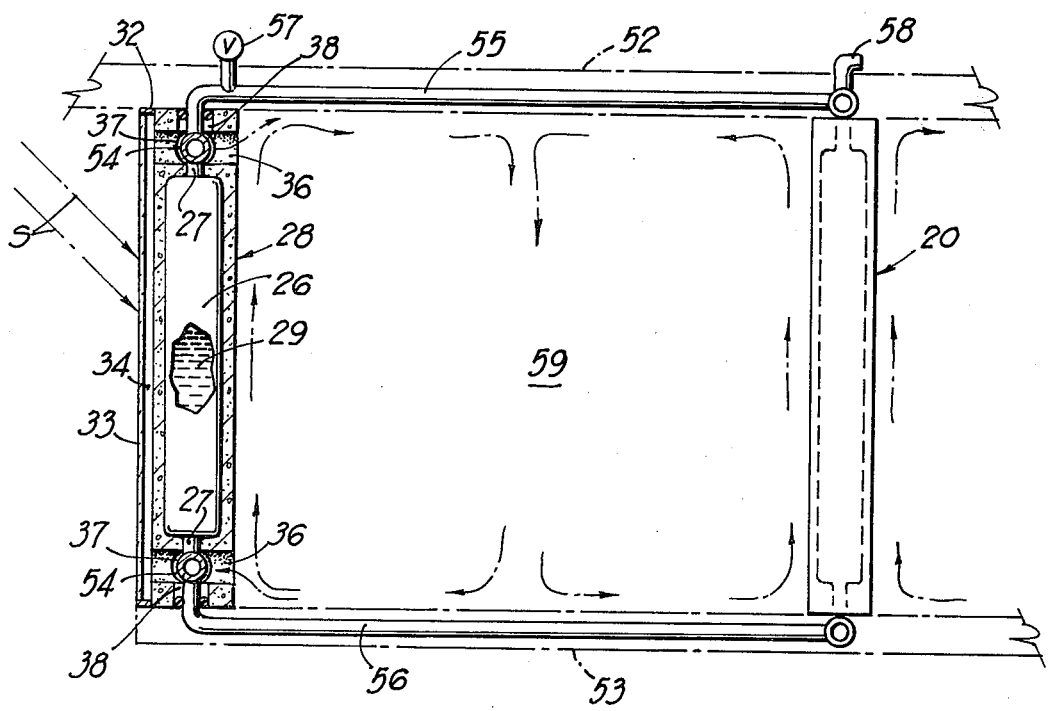
FIG 6

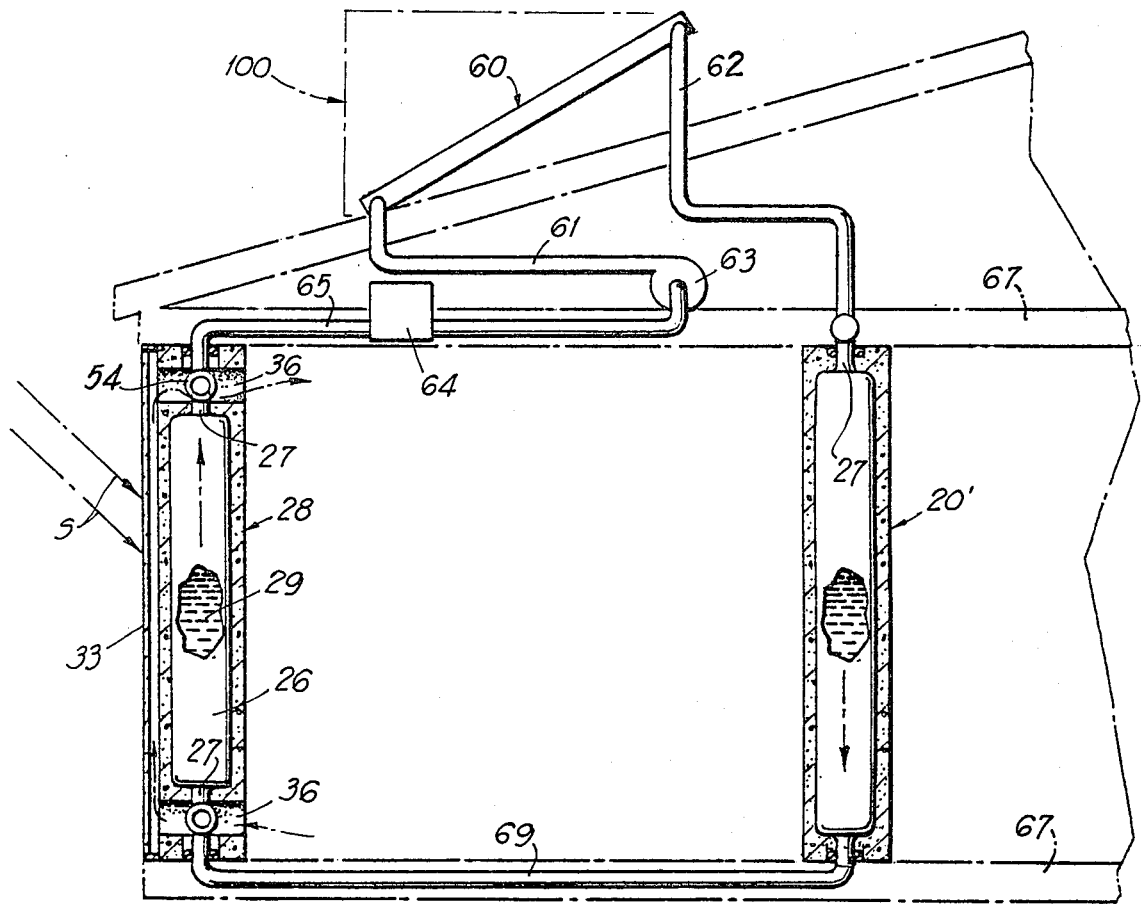
FIG 8
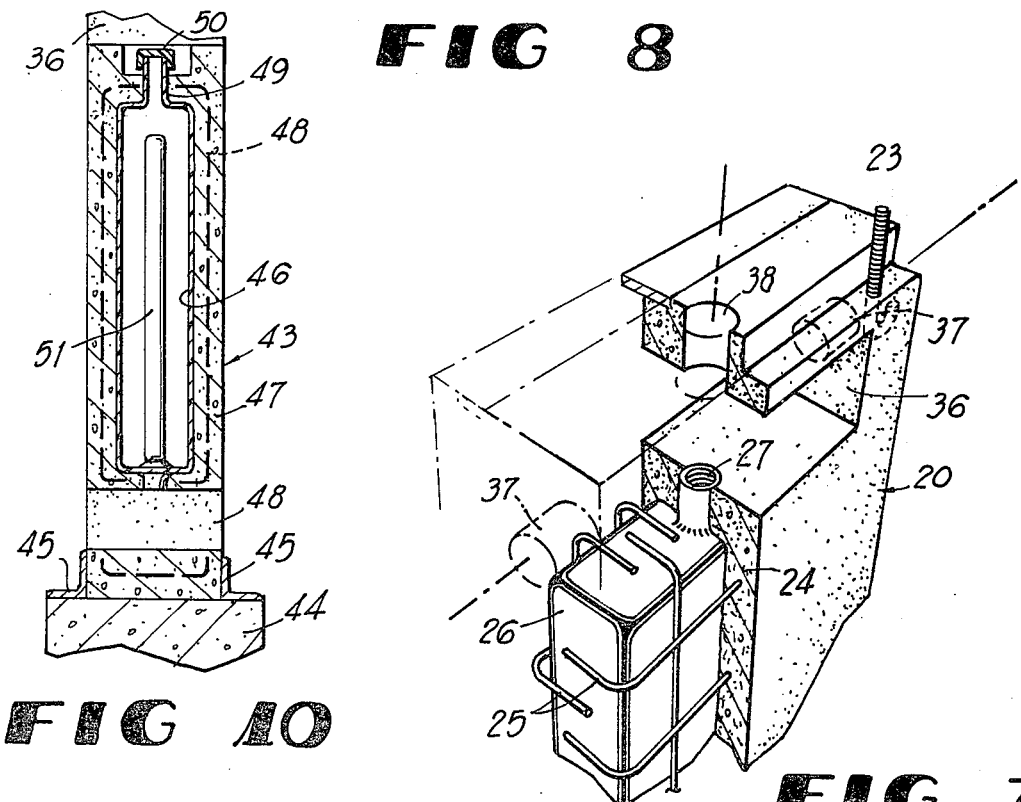
FIG 10
FIG 7

PREFABRICATED PANEL FOR BUILDING CONSTRUCTION AND METHOD OF MANUFACTURING

BACKGROUND OF THE INVENTION

Passive solar devices until recently have been largely neglected in the rapid advance of solar energy technology. Active solar devices and systems have been in the forefront and while very useful are intrinsically complex and costly.

In view of the above, the present invention seeks to fulfill a definite need in the art for an efficient and economical passive solar energy module which can serve as a primary exterior or interior construction element for buildings while simultaneously serving as a solar collector and/or solar energy storage unit, alone or as a part of a complete solar heating system for buildings.

A primary feature of the invention as embodied in a precast solar structural panel for buildings is the inclusion therein of an enclosed fluid containment element for a thermally efficient fluid, such as water, which completely seals the fluid from the thin walls of the structural panel. The inclusion of this feature renders the module or panel lightweight particularly when the fluid containment element is empty, thereby greatly facilitating the handling of panels as in the erection of buildings.

Another major aspect of the invention resides in a simplified, economical and very efficient method of casting the solar construction panel, which includes the utilization of the filled essentially non-compressible fluid containment element as a core in the casting process to produce a permanent internal cavity in the prefabricated panel, with the containment element residing permanently therein.

With minor variations in the placement of thermal insulation and/or glass or the like on surfaces of the construction panel, the same can serve as a passive solar collector and as a radiator of thermal energy, or as a simple storage module for thermal energy.

The module or panel has self-contained convection passages to promote circulation of air into and from living spaces of a building. The sealed-in fluid containment is equipped with fittings enabling the ready coupling of plural panels in accordance with the invention in a complete heating system.

The use of the construction panel in building construction can eliminate in whole or in part for such elements as framing studs, dry wall, thermal insulation, and various siding. By utilizing reinforced concrete as the moldable and curable element of the panel, structural integrity, appearance and longevity are achieved.

Other features and advantages of the invention will become apparent during the course of the following description.

BRIEF DESCRIPTION OF THE DRAWINGS

FIG. 4 is a side elevation of a thermally insulated panel in accordance with the invention.

FIG. 5 is a vertical section taken on line 5—5 of FIG. 4.

FIG. 6 is a fragmentary elevational view, partly in section, showing a building heating system utilizing connected panels in accordance with the invention.

FIG. 7 is a fragmentary perspective view, partly in section, depicting the internal construction of the basic solar panel according to the invention.

FIG. 8 is a view similar to FIG. 6 showing utilization of solar construction panels supplemented with an active solar heating system.

FIG. 10 is a vertical section taken through a solar construction panel in accordance with the invention and showing an internal pressure relief element.

DETAILED DESCRIPTION

Figure 1:
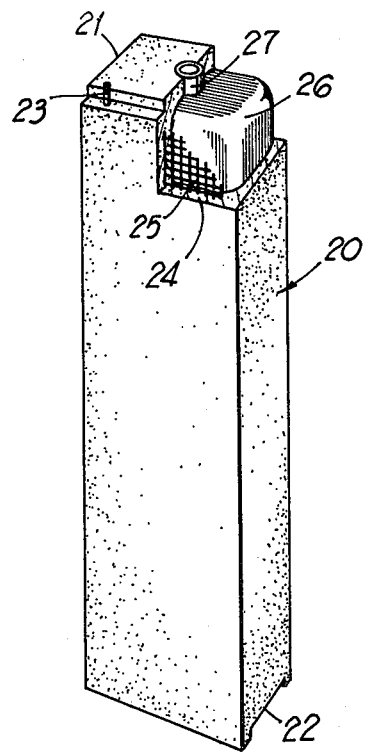
FIG. 1 is a perpective view of a prefabricated construction panel in accordance with the present invention.

Referring to the drawings in detail wherein like numerals designate like parts, the numeral 20, FIG. 1, designates a basic precast building construction panel or module in accordance with the invention. The panel 20 is illustrated in the form of a rectangular parallelepiped, convenient for constructing a building wall, but this shape could be modified. The opposite ends of the panel 20 may be tongued and grooved to facilitate construction as indicated at 21 and 22, and a suitable anchor or anchors 23 is embedded in the wall of the panel also to facilitate construction.

The panel 20 has a comparatively thin wall or shell 24 of concrete on all sides and ends thereof and this shell contains embedded therein reinforcing mesh 25 of metal or other suitable material extending through all walls of the concrete shell.

Permanently enclosed within the thin concrete shell of panel 20, and forming a key element of the invention, is a polyethylene or other plastic thermal fluid containment or liner 26 adapted to be filled with water or other thermally efficient liquid. The containment 26 also serves the dual purpose of a molding core to form the internal cavity of the panel 20 during simplified manufacturing process which will be described. The containment 26 is locked and concealed inside of the thin reinforced concrete shell of the finished solar panel 20 and isolates the contained liquid from the shell of the panel as well as from its exterior.

To facilitate thermal fluid flow in a solar heating system utilizing the invention, the containment 26 is equipped with top and bottom end internally threaded nipples 27 which are an integral and continuous part of the containment 26. In the basic panel shown in FIG. 1, the ends of the nipples 27 are flush with the end faces of the concrete shell to facilitate connection of the containment with other elements in a system.

The basic panel 20 can serve in a solar heating system as a heat storage module and simple radiator to warm an interior space. The panel 20 forms a strong basic construction element which is very light compared to a solid reinforced concrete member. The containment 26 can be emptied of its fluid to further minimize weight in the handling or construction process. The use of the panel 20 in the construction of building walls can eliminate many of the customary costly elements including studding and dry wall. The panel addresses itself well to contemporary as well as traditional architecture and possesses high versatility of use, both in exterior walls and interior partition walls.

Figure 2:
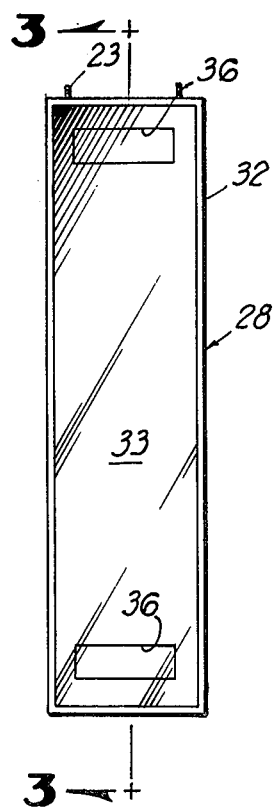
FIG. 2 is a side elevation of a solar construction panel with glazing on one face thereof and including convection passages near its top and bottom.
Figure 3:
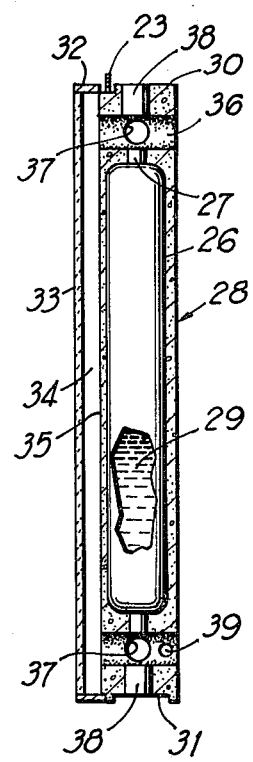
FIG. 3 is a vertical section taken on line 3—3 of FIG. 2.

FIGS. 2 and 3 show a modified solar panel 28 adapted to serve as a solar energy absorber or collector, as in the south wall of a building. The panel 28 is basically similar to the panel 20 in that it has the internal molded in situ containment 26 for thermal fluid 29 with connecting nipples 27. The end faces of the panel are tongued and grooved at 30 and 31 and an anchor or anchors 23 are provided.

In the solar collector panel 28, a glazing frame 32 is attached fixedly to the concrete shell of the panel in the manufacturing process and this frame is fitted with a glass or other radiation admitting panel 33, thereby forming an air space 34 between the panel 33 and the exterior face 35 of the collector panel which is provided with a solar absorbing coating. The panel 28 is provided immediately above and below the ends of fluid containment 26 with convection air flow passages 36, each communicating with the space or passage 34 to facilitate convected flow of air therethrough, as will be further described. Intersecting passages 37 and 38 for piping, not yet shown or described, are included, and the panel 28 may also be equipped with internal electrical wiring passage means 39, in some cases.

The panel 28 thus constructed can serve as an efficient solar collector, thermal storage unit, direct heating radiator and as an element in either a passive solar heating system, FIG. 6, or an active system, FIG. 8.

FIGS. 4 and 5 show a further modified panel 40 basically similar to panel 20 but adapted to be utilized on exterior building walls other than the south wall. The described frame 32, or a similar frame, may form a boundary for a layer of thermal insulation 41 applied to the exterior surface of the solar panel 40, siding 42 or the like, or other finishing can be applied optionally over the insulation layer 41, whose composition and physical nature can be widely varied. The panel 40 will serve to store heat and radiate heat inwardly while also providing an outer insulation barrier against the loss of heat outwardly.

FIG. 10 of the drawings illustrates a further feature of the invention which may be optionally employed. In this figure, a solar construction panel 43 in accordance with the basic invention, is shown resting on a concrete footing 44 and held between locating angle bars 45 on the footing. The described fluid containment 46 is provided internally of the panel 43, whose reinforcing mesh 47 and convected air passages 48 are also shown. The containment 46 has only an upper nipple 49 which can be capped at 50.

To cope with the problem of freezing or other overpressurization of the contained fluid, such as water, a safety relief element 51 is placed in the containment 46 or liner, in the form of a hollow readily crushable bar formed of suitable corrugated material. Should freezing occur, the resulting expansion would be compensated for by the crushable element 51 to prevent damaging or destruction of the panel 43. The panel 43 is but another variation of the basic, lightweight, construction panel 20 having a thin reinforced concrete shell and a permanently enclosed non-corrosive bladder, containment or liner.

FIG. 6 depicts a fragment of a passive solar heating system between adjacent floors 52 and 53 of a building. The south wall receiving solar radiation S is constructed from a plurality of the solar collector panels 28 connected in a course by horizontal pipes 54 received through the passages 37. Other exterior walls of the building, not shown, can be constructed from the modified panels 40. Internal partition walls are constructed from the required number of the basic panels 20, FIG. 6, which interior walls are system connected with collector panels 28 through piping 55 and 56. Customary vents 57 and vacuum breakers 58 are provided throughout the system.

In operation, the passive system shown in FIG. 6 functions as follows. Solar energy is absorbed and stored in collector panels 28 which are also serving as primary structural modules in the building. Air convection is induced thermally through the passages 36 and 34 to deliver solar heated air directly into the living space 59. Simultaneously, the panels 28 radiate heat and slowly convect heat into the living space as do the other insulated exterior wall panels 40 of the building.

Simultaneously, convected fluid currents are induced in the containments 26 and these currents of solar heated fluid travel through the piping 55 and 56 into and through the other adjacent wall panels of the building including the interior wall panels 20 which store and radiate heat into the living spaces of the building. The system is versatile, entirely self-contained, extremely simple, and requires substantially no maintenance. It is capable of surviving the life of the building.

FIG. 8 shows the invention adapted to a building which also possesses a roof-mounted active solar energy collector 60 of conventional construction whose interior solar heated fluid conduits are connected with external circulating pipes 61 and 62, the pipe 61 being connected to a circulating pump 63 drawing fluid from a surge tank 64 connected by piping 65 to the horizontal piping 54 of the south wall solar collector panels 28 which continue to function as described in the passive system of FIG. 6.

Additionally, in FIG. 8, interior walls of the building between its floors 67 are constructed from panels 20 connected at the top of panel 20 to piping 62 and at the bottom of panel 20 to return piping 69. It may be seen that the heating system of FIG. 8 incorporates the passive operation, previously described, plus boosting from an active solar collector system 60, etc. This further demonstrates the versatility of the invention as well as its simplicity.

System modifications are easily provided to result in a cooling configuration to be employed during summer operation. The system is identical to FIG. 8 with one modification. A cooling device is substituted for the active solar energy collector 60. The cooling device, namely a solar cooler, which is shown in phantom lines in FIG. 8 and designated 100 can simply be a riffled, sloped trough through which water can cascade at night thereby loosing heat by evaporation and nocturnal radiation. The cooling device 100 also may be a commercially available evaporative cooler. With this type of arrangement, the heat from the room as well as heat from the outside which penetrates the insulative panels 33 is absorbed by the liquid filled panels and stored until night. At this time, pump 63 operates to move the heated fluid within the panel to the cooling device 100 where heat is economically rejected at night. Thereby the wall can be maintained at a temperature which is below that of the surroundings by circulating and cooling water at night using the principles of evaporative cooling and solar radiation.

As previously noted, a very important aspect of the invention resides in a unique and simplified method of manufacturing the described solar panels, which method is the key to the practicality of the invention. It is thought that the absence of the inventive concept in the prior art results from the fact that no economical and practical way to manufacture the described panels has been available. The present invention completely and economically solves this problem.

Figure 9A:
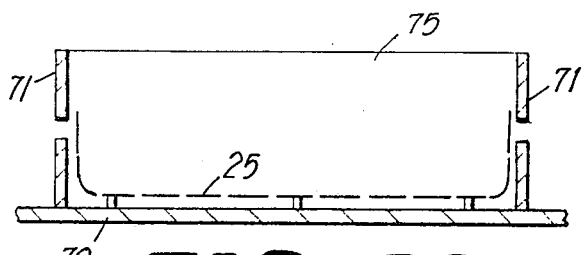
FIGS. 9A through 9H are fragmentary cross sectional views depicting steps in the method of manufacturing the solar panel in accordance with the invention.
Figure 9E:
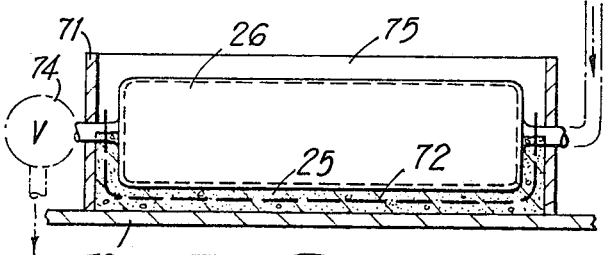
Figure 9B:
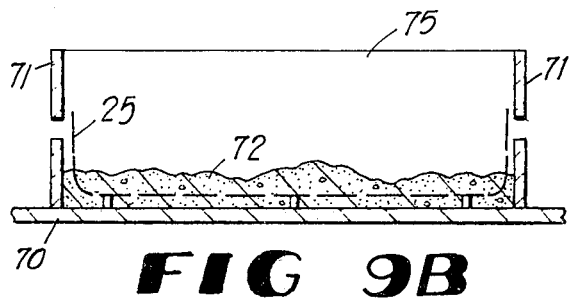
Figure 9F:
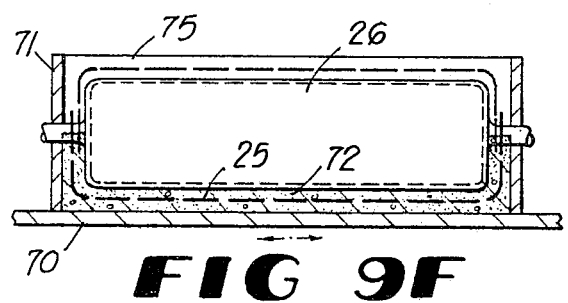
Figure 9C:
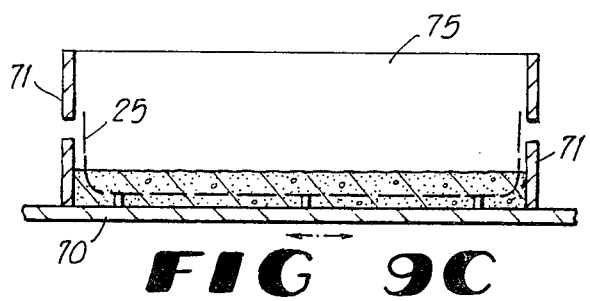

The method of manufacturing the construction panel in accordance with the invention is illustrated in FIGS. 9A through 9H. It is a casting process which takes place as follows. As shown in FIG. 9A, a casting mold for the panel consists of a floor 70 and two spaced parallel upstanding side walls 75, as well as two spaced parallel upstanding end walls 71. The reinforcing mesh 25 is first positioned in the mold in spaced relation to its walls 75 and 71. Next, as shown in FIG. 9B, a pre-measured quanity of concrete 72 is introduced into the mold cavity to embed the reinforcing mesh 25, as shown, and the mold is vibrated to level out the concrete and rid it of trapped air as shown in FIG. 9C. Next, the collapsible liner or containment 26 is placed on the bed of concrete in the mold cavity, FIG. 9D, and the containment is connected to a source of fluid under pressure, preferably water, in an elevated tank 73. A fluid pressure control and outlet valve 74 for the containment 26 is provided as shown in FIG. 9E. The containment 26 is now filled with preferably hot water from the tank 73, the heat promoting curing of the concrete, and the containment is rendered imcompressible.

The mold is again vibrated, FIG. 9F, to promote the sinking of the filled containment 26 into the wet concrete mass. Advantage is taken of the fact that the specific gravity of water is almost exactly one-half the specific gravity of concrete, so that upon completion of the sinking the desired wall thickness of the concrete panel shell is achieved and the containment 26 is floating in the concrete with one-half of its volume submerged in the concrete and one-half projecting outside of the concrete.

Figure 9G:
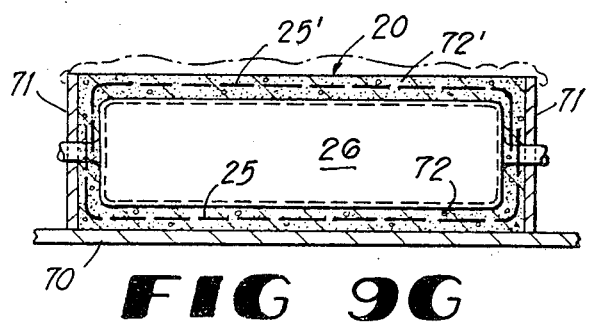
Figure 9D:
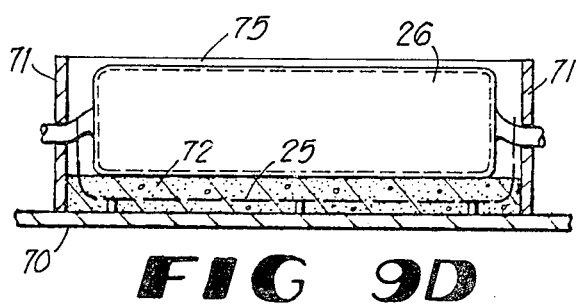

Next, as shown in FIG. 9F, additional reinforcing mesh 25' is positioned above the containment 26 in the top portion of the mold and the mold cavity is filled up with additional concrete 72' to completely encase the containment and reinforcing mesh, FIG. 9G, followed by further local vibration and screeding off of excess concrete to complete the basic panel 20.

Figure 9H:
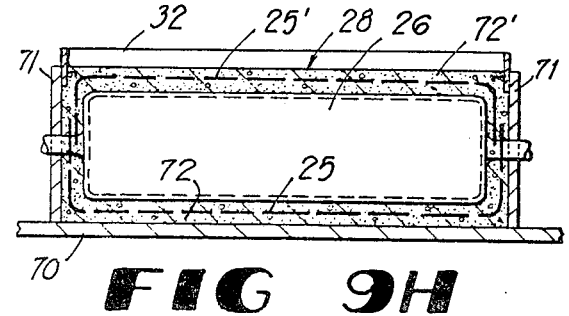

When required for producing the collector panel, cores are properly positioned for producing air passages 36 and intersecting passages 37 and 38 which are shown in the panel in FIGS. 2 and 3, and the described glazing frame 32, FIG. 9H, is anchored in the wet concrete mass before completion of curing. It should be noted that at this point, interior and/or exterior surfaces may be textured to facilitate the desired architectural effect before the concrete has reached a cured state. Upon completion of the curing process, the mold 70-71 is stripped from the product and the mold is provided with the usual release coating to facilitate separation or stripping of later manufactured panels.

The manufacturing method is characterized by simplicity, economy and full compatibility with mass production.

While the containment 26 is shown for convenience as a rectangular parallelepiped unit, it should be understood that it can be formed in different ways under the invention. For example, the fluid containment may be a bank of spaced parallel tubes of cylindrical cross section joined with cross headers at their tops and bottoms, which headers may be connected into the piping system as in FIGS. 6 and 8. Corner triangular containments can be provided within the rectangular panel interconnected by piping. A variety of other containment forms can be utilized. Some of these smaller containment forms are superior for use in domestic water heating systems, where greater fluid pressures must be withstood.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

I claim:

1. A rigid unitary substantially rectangular structural panel of a size suitable for spanning at least vertically a substantial portion of a building wall, said structural panel comprising a non-rigid thin wall collapsible plastics material containment adapted to hold a thermal fluid, said containment having a neck of substantially reduced size at one end thereof, the containment being otherwise closed and being fluid impermeable and resistant to corrosion, a thin shell of concrete cast onto and completely surrounding and enclosing the containment and externally supporting the walls of the containment, said neck of the containment being embedded in one end wall of the concrete shell and the neck having a mouth opening through the exterior of the concrete shell, whereby the interior of the containment communicates with the exterior of the structural panel, and a reinforcing mesh for the panel embedded within the concrete shell in surrounding relationship to the containment adjacent to all walls of the containment and being completely concealed and enclosed within said shell.

2. A rigid unitary substantially rectangular structural panel as defined in claim 2, wherein the containment is a single chamber bottle-like containment which is substantially rectangular, and the walls of the containment substantially spanning the walls of said panel, lengthwise, widthwise and across its thickness.

3. A rigid unitary substantially rectangular structural panel as defined in claim 2, and a radiation permeable plate fixed to one major side wall of the panel and spanning said side wall substantially and being held in spaced parallel relationship to the side wall, and the panel having convection passages formed therein exteriorly of the containment and being in communication with a space existing between said plate and said side wall.

* * * * *